Patented Nov. 25, 1952

2,619,458

UNITED STATES PATENT OFFICE 2,619,458

COMPOSITIONS EMBODYING SOLID LUBRICANTS

Byron V. McBride, Irwin, Pa., assignor to Westinghouse Electric Corporation, East Pittsburgh, Pa., a corporation of Pennsylvania No Drawing. Application May 14, 1949, Serial No. 93,422

8 Claims. (Cl. 252—25)

This invention relates to solid lubricant compositions and methods for applying them to bearing surfaces.

It is desirable to provide liquid lubricating compositions that may be applied as a coating to any portion of a bearing surface which, upon drying or other treatment, produce an adherent film of solid lubricant. Examples of such solid lubricants are the disulfides, selenides and tellurides of molybdenum, tungsten and titanium. Solid lubricant films will provide a supply of lubricant adequate for the expected life of many bearing applications. Their freedom from dripping or running and relative cleanliness constitute other desirable features of such applied solid lubricants.

It is necessary, however, that the solid lubricant not deteriorate metal bearing surfaces under the conditions met in service. Since most solid lubricants have no protective properties and do not inhibit corrosion on fine bearing surfaces, this problem has been a serious drawback to their use in certain applications. Ferrous metal bearings in particular may be subject to corrosion.

The object of this invention is to provide a composition containing a suspension of a solid lubricant, in combination with a corrosion inhibitor.

A further object of the invention is to provide for applying to bearing surfaces a non-corrosive film or coating of a solid lubricant.

Other objects of the invention will, in part, be obvious and will, in part appear hereinafter.

This invention relates to a lubricant composition in which there is combined a solid lubricant, typified by molybdenum disulfide, of colloidal fineness suspended in a liquid carrying medium and a corrosion inhibitor selected from the group of hexavalent chromium compounds. When applied to a metal surface and dried, the lubricant composition produces thereon an adherent film of the molybdenum disulfide and the corrosion inhibitor. The combination of ingredients provides a low coefficient of friction and maintains the bearing surfaces in an optimum condition free from corrosion and pitting even under adverse conditions.

It has been discovered that under conditions of high humidities so that the bearing surfaces become wet with moisture, that coatings of molybdenum disulfide alone often result in corrosion and, in extreme cases, pitting of the bearing surfaces occurs. This phenomenon is novel and no explanation has been found to account for the corrosion that occurs. However, it may result in the deterioration of bearing surfaces to which the molybdenum disulfide has been applied with the consequent impairment of the bearing for its intended use.

The application of conventional corrosion inhibitors to molybdenum disulfide has been found to be unsuccessful and unsatisfactory. For example, sodium rhodizonate and quinoline ethiodide and the like, which are considered to be excellent corrosion inhibitors, have not inhibited the corroding and pitting action of molybdenum disulfide in contact with steel surfaces in a highly humid atmosphere.

The combination of one or more hexavalent chromium compounds such, for example, as zinc chromate, sodium dichromate, potassium dichromate, chromic acid, and ammonium chromate in the amounts of from .2% to 25% of the weight of the molybdenum disulfide has been found to inhibit the corroding action of the molybdenum disulfide without impairing the anti-friction properties of the bearing. For most purposes, not more than 5% of the inhibiting hexavalent chromium compound, based on the weight of the solid lubricant, is recommended since there is no particular benefit derived from any excess of above 5%. In amounts above 25% of the weight of the solid lubricant, the chromium compound impairs the anti-friction properties of the solid lubricant.

The molybdenum disulfide may be simply thoroughly admixed with from 0.2% to 25% of its weight of a hexavalent chromium compound and the mixture, ordinarily a powder, applied to the bearing surface, and the bearing run to rub the powders upon the metal whereupon an adherent film is produced. However, it is more convenient to prepare a fluid suspension or a paste of the powders, by applying an evaporable liquid such as water, an alcohol, or other volatile organic solvent. The amount of the liquid may be varied greatly depending on the nature of the desired composition.

In order to produce fluid compositions which are non-settling and which wet bearings readily and apply a uniformly thin coating, it has been found desirable to include therein suspending and wetting agents.

An example of a composition which has been found to produce solid lubricant films of outstanding anti-friction properties with freedom from corrosion is as follows:

Example 1

| | Parts |
|---|---|
| Molybdenum disulfide | 100 |
| Methyl cellulose | 2 |
| A wetting agent | 1½ |
| Sodium dichromate | 1 |
| Water | 100 |

All parts are by weight. The amount of water may be varied from 50 to 200 parts in the example. The molybdenum disulfide in the above example is the highly purified, colloidally fine product, whose particles are from 1 to 50 microns in size, produced by the process set forth in Kaercher Patent 2,367,946. The use of the highly purified product insures that no abrasives or other impurities are present which would impair the anti-friction properties of the molybdenum disulfide.

The methyl cellulose in the above composition functions as a suspending agent and it may be replaced with other non-corroding water soluble suspending agents such as ethyl cellulose, polyvinyl alcohol and tragacanth gum. The amount of the methyl cellulose or other suspending agent may be varied from about 1 to 5 parts per 100 parts of the molybdenum disulfide.

A great number of wetting agents have been employed to insure the thorough wetting of the colloidal molybdenum disulfide by the aqueous medium. Satisfactory wetting agents are dialkyl esters of sulfosuccinic acid, such as the dioctyl ester of sodium sulfosuccinic acid. The sulphonates and sulphates of alkyl aryl compounds having at least one long carbon chain alkyl group of from 6 to 16 carbon atoms, are examples of other suitable wetting agents for this purpose.

Another example of a suitable lubricant combination is:

Example 2

| | Parts |
|---|---|
| Molybdenum disulfide | 100 |
| Ammonium chromate | 5 |
| Tragacanth gum | 1 |
| Wetting agent | 1 |
| Isopropyl alcohol | 5 |
| Water | 100 |

The use of isopropyl alcohol enables the easier preparation of the suspension. Ethanol or methanol or other aliphatic monohydric alcohol soluble in water may be substituted for the isopropyl alcohol.

When the bearings treated with the solid lubricant and corrosion inhibitor are to be employed under conditions where they may be subjected to a flow of water or heavy condensation, it is preferable to employ the relatively water insoluble chromates, such as lead chromate, barium chromate, or zinc chromate, or mixtures thereof, as the inhibitor. The following compositions were prepared with these chromates:

Example 3

| | Parts |
|---|---|
| Molybdenum disulfide | 100 |
| Zinc chromate | 10 |
| Xylol | 50 |

Bearings treated with this composition and dried to evaporate the xylol had good anti-friction properties and stood up satisfactorily under very severe humidity conditions.

Example 4

| | Parts |
|---|---|
| Molybdenum disulfide | 35 |
| Zinc chromate | 7.5 |
| Xylol | 15.5 |

After applying a dry coating of this composition to bearings and exposing the bearings to a temperature of 260° C. for 16 hours, then 24 hours at 100% relative humidity at 30° C., and repeating, and drying for one hour at 260° C., the bearings were tested and found to turn easily and were in satisfactory condition.

The compositions of the above examples are specific to molybdenum disulfide. However, there may be employed the solid lubricants selected from at least one of group consisting of the disulfides, selenides and tellurides of molybdenum, tungsten and titanium. Any one or two or more of these solids may be admixed. These solids when applied to bearings will result in an adherent lubricant coating characterized by a low coefficient of friction.

Numerous compositions such as in the above examples have been applied to bearing members. When the coating of composition was dried to evaporate the water or other liquid carrier, a thin film of the solid lubricant and the chromium compound was deposited on the bearing surface. The anti-friction properties of the films for nearly all applications were highly superior. Furthermore, there was no corrosion or pitting under various prolonged tests under normally expected atmospheric conditions, whereas similar molybdenum disulfide compositions without the chromium compound resulted in corrosion of the bearing surfaces under conditions in which water condensed on the applied molybdenum disulfide.

In one particular case, a thermostat comprised threaded bearing surfaces. Tests were made by applying to the threaded bearing surfaces of three thermostats: (1) a colloidal suspension of graphite, (2) a suspension of molybdenum disulfide with the chromium compound in accordance with the present invention, and (3) a similar suspension without the chromium compound, respectively. Accelerated tests at temperatures of up to 500° F. showed that bearings carrying a film of the molybdenum disulfide lubricant compositions (2) and (3) gave outstanding results with freedom from galling or seizing of the threaded bearing surfaces, whereas films of the graphite composition (1) did result in galling and seizing in a substantial number of the test thermostats. However, on subjecting the same structures to atmospheres of 96% and higher humidity, wherein water condensed on the bearing surfaces, the molybdenum disulfide composition (3) without the corrosion inhibitors resulted in the definite corroding of the threaded bearing surfaces, and eventually the thermostat failed to function properly. The molybdenum disulfide composition (2) with the chromium compound, however, gave a perfect performance.

The aqueous lubricant composition of this invention may be applied to bearing surfaces by simply dipping the parts in the composition, or brushing, or spraying, or otherwise coating the bearing surface with the composition. The bearing surfaces with the coating of the suspension may be dried at room temperature or in an oven at an elevated temperature to drive off the water and to deposit an adherent film of solid lubricant. In some cases, it has been found desirable to heat the bearing surface to a temperature of about 150° C. or higher and upon applying to the heated surface a coating of the suspension of molybdenum disulfide in water, the latent heat in the metal of the bearing will evaporate the water and produce a satisfactory coating of the molybdenum disulfide lubricant and the inhibiting hexavalent chromium compound.

Since certain changes may be made in the above invention and different embodiments of the invention may be made without departing from the scope thereof, it is intended that all matter contained in the above-described disclosure shall be interpreted as illustrative and not in a limiting sense.

I claim as my invention:

1. A dry solid lubricant composition comprising as its essential ingredients 100 parts by weight of a solid lubricant selected from at least one of the group consisting of the disulfides, selenides and tellurides of molybdenum, tungsten and titanium, and from 0.2 to 25 parts by weight of a hexavalent chromium compound as a corrosion inhibitor, the lubricant composition functioning in a dry state without corrosion of the bearing surfaces to which it is applied.

2. A lubricant composition comprising as its essential ingredients 100 parts by weight of a solid lubricant selected from at least one of the group consisting of the disulfides, selenides and tellurides of molybdenum, tungsten and titanium, from 0.2 to 25 parts by weight of a relatively water insoluble hexavalent chromium compound as a corrosion inhibitor, and a volatile liquid suspending the solid lubricant and the chromium compound.

3. A lubricant composition comprising in combination 100 parts by weight of molybdenum disulfide of colloidal fineness, about 1 to 5 parts by weight of a suspending agent, from about ½ to 3 parts by weight of a wetting agent, from about 0.2 to 5 parts by weight of a water soluble hexavalent chromium compound as a corrosion inhibitor, and sufficient water to provide a fluid suspension.

4. A lubricant composition comprising in combination 100 parts by weight of molybdenum disulfide of colloidal fineness, about 1 to 5 parts by weight of a suspending agent, from about ½ to 3 parts by weight of a wetting agent, from about 0.2 to 5 parts by weight of a water soluble hexavalent chromium compound as a corrosion inhibitor, 5 parts by weight of an aliphatic monohydric alcohol, and 50 to 200 parts by weight of water to provide a fluid suspension.

5. A lubricant composition comprising in combination 100 parts by weight of a colloidally fine solid lubricant selected from the class consisting of the disulfides, selenides and tellurides of molybdenum, tungsten and titanium, from 1 to 5 parts by weight of a suspending agent, from ½ to 3 parts by weight of a wetting agent, from about 0.2 to 5 parts by weight of a water soluble hexavalent chromium compound as a corrosion inhibitor, and sufficient water to provide a fluid suspension.

6. In the method of providing a corrosion resistant film of solid lubricant on a ferrous metal surface comprising applying an aqueous suspension containing molybdenum disulfide of colloidal fineness and for each 100 parts by weight of the molybdenum disulfide from 0.2 to 25 parts by weight of a water soluble hexavalent chromium compound and drying the applied suspension to produce an adherent solid film of the solid lubricant and the hexavalent chromium compound.

7. In a bearing comprising meeting surfaces disposed for relative motion to one another, a dry corrosion resistant film of solid lubricant applied to the surfaces, the film comprising as its essential components 100 parts by weight of molybdenum disulfide and from 0.2 to 25 parts by weight of a hexavalent chromium compound.

8. The bearing of claim 7, wherein the hexavalent chromium compound is water insoluble chromate.

BYRON V. McBRIDE.

REFERENCES CITED

The following references are of record in the file of this patent:

UNITED STATES PATENTS

| Number | Name | Date |
|---|---|---|
| 2,328,540 | Hochwalt | Sept. 7, 1943 |
| 2,346,124 | Dew | Apr. 4, 1944 |
| 2,361,211 | Kalischer | Oct. 24, 1944 |
| 2,393,799 | Morgan et al. | Jan. 29, 1946 |
| 2,420,886 | Laffoon | May 20, 1947 |